(12) United States Patent
Xiao et al.

(10) Patent No.: US 11,714,836 B2
(45) Date of Patent: Aug. 1, 2023

(54) METHOD FOR HIGH-PERFORMANCE TRACEABILITY QUERY ORIENTED TO MULTI-CHAIN DATA ASSOCIATION

(71) Applicant: Huazhong University of Science and Technology, Wuhan (CN)

(72) Inventors: Jiang Xiao, Wuhan (CN); Jian Chang, Wuhan (CN); Rui Han, Wuhan (CN); Xiaohai Dai, Wuhan (CN); Hai Jin, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 89 days.

(21) Appl. No.: 17/455,502

(22) Filed: Nov. 18, 2021

(65) Prior Publication Data

US 2022/0309080 A1    Sep. 29, 2022

(30) Foreign Application Priority Data

Mar. 23, 2021 (CN) .......................... 202110312138.5

(51) Int. Cl.
*G06F 16/2457* (2019.01)
*G06F 16/248* (2019.01)
(Continued)

(52) U.S. Cl.
CPC .......... *G06F 16/288* (2019.01); *G06F 16/248* (2019.01); *G06F 16/24575* (2019.01);
(Continued)

(58) Field of Classification Search
CPC ............. G06F 16/288; G06F 16/24575; G06F 16/248; G06F 16/285; G06F 16/24553;
(Continued)

(56) References Cited

U.S. PATENT DOCUMENTS

| 11,526,622 B1* | 12/2022 | White | G06F 21/6227 |
| 2018/0005186 A1* | 1/2018 | Hunn | G06F 16/93 |

(Continued)

FOREIGN PATENT DOCUMENTS

| CN | 108599963 B | 9/2018 |
| CN | 109034833 A | 12/2018 |

(Continued)

OTHER PUBLICATIONS

Chinese Office Action dated Mar. 21, 2022 in Chinese Application No. 20211031213805.

*Primary Examiner* — Jorge A Casanova
(74) *Attorney, Agent, or Firm* — Michael Ye; Rimon Law

(57) ABSTRACT

The present invention relates a method for high-performance traceability query oriented to multi-chain data association, comprising: identifying a target transaction needing the traceability query; searching out all corresponding target chains based on cross-chain transaction data association; making query requests parallelly; and executing the query among the target chains according to a key value of the target transaction and returning query results. The blockchain traceability query method proposed by the present invention is different from serialized block data query conducted in the chain-type structure, and the disclosed cross-chain query operation can be parallelly executed, leading to improved efficiency of traceability query. Opposite to the conventional blockchain where blocks are used as nodes of chains, the present invention directly uses sub blockchains as nodes of the SRB. Since sub blockchains can be dynamically added or removed, the present invention enhances the scalability of the entire system.

8 Claims, 2 Drawing Sheets

(51) Int. Cl.
*G06F 16/28* (2019.01)
*G06Q 20/38* (2012.01)

(52) U.S. Cl.
CPC ....... *G06F 16/285* (2019.01); *G06Q 20/3823* (2013.01); *G06Q 20/3827* (2013.01)

(58) Field of Classification Search
CPC .............. G06F 16/24532; G06F 16/27; G06F 16/24558; G06Q 20/3823; G06Q 20/3827; G06Q 20/02; G06Q 30/018
See application file for complete search history.

(56) References Cited

U.S. PATENT DOCUMENTS

2019/0295079 A1* 9/2019 Bae ................... G06F 16/1824
2019/0354518 A1* 11/2019 Zochowski ......... G06F 16/2379

FOREIGN PATENT DOCUMENTS

| CN | 110780945 A | 2/2020 |
| CN | 110941647 A | 3/2020 |
| CN | 111489256 A | 8/2020 |

\* cited by examiner

METHOD FOR HIGH-PERFORMANCE TRACEABILITY QUERY ORIENTED TO MULTI-CHAIN DATA ASSOCIATION

ORIENTED TO MULTI-CHAIN DATA ASSOCIATION

This application claims the benefit of the Chinese Patent Applications No. CN 202110312138.5 filed on Mar. 23, 2021, which is hereby incorporated by reference as if fully set forth herein.

BACKGROUND OF THE INVENTION

1. Technical Field

The present invention relates to blockchain technologies, and more particularly to a method for high-performance traceability query oriented to multi-chain data association.

2. Description of Related Art

In multi-echelon supply chain systems, effectively tracking articles and verifying their authenticity forms a major challenge. The authenticity of articles is ensured by retrieving the provenance of a series of storage information or logistic information from one entity to another, such as tracking genuineness of articles, automotive parts or auction circulation of art works. Therein, executing cross-chain traceability query for articles in multi-echelon supply chain, and ensuring high overall performance of the supply chain traceability query as well as the completeness of the results are of particular significance.

A blockchain is an append-only system, which means that once a transaction record is entered into a blockchain, it cannot be removed, so as to ensure the reliability of the system. As data in a ledger of a blockchain can only increase over time, the growing data of irrelevant transactions in the ledger forms a challenge to the efficiency of traceability query for a given transaction. With the continuous improvement of consensus algorithms, TPS (Transaction Per Second, or the number of transactions the system can process every second) has been increasingly enhanced, leading to sharply growing data storage overheads. When more and more transaction data are stored in a blockchain, it means that association among given transaction data decreases and that a user needs to execute query among a large amount of less associated data, leading to low efficiency about traceability query. Completeness of data query is also a major issue to be addressed in multi-echelon supply chain systems since data distributed across blockchains become independent, it is difficult to ensure that all query results of the cross-chain traceability query have been reported. Different from a distributed database, a blockchain exists in an untrusted environment, and how to ensure the completeness of cross-chain transaction traceability query is particularly challenging.

Blockchain applications are like separate islets. As their different structures make information exchange difficult if not impossible, usability of data information in different chains is significantly limited. To date, traceability query for data among different chains has been unachievable. Cross-chain assets transfer over channels between chains requires verification based on multiple signatures and completeness of cross-chain transaction traceability query is problematic.

China Patent Publication No. CN109034833A discloses a product back-tracing information management system and method. It implements an "on/off-chain" co-operative mechanism to manage information about supply chains. The known method generally involves first using "off-chain" subsystems to collect information about vendors in a supply chain of a product, and recording information of the product and information generated when the product flows along the supply chain. Then the collected information data and verification evidence are uploaded to a blockchain-based "on-chain" subsystem for storage and management. The prior disclosure is the first one to solve problems of unauthorized manipulation and trust chain transfer as happening in traditional tracking-back systems, thereby improving the credibility and ensuring the flexibility and scalability of the product tracing-back system.

However, this known system has its ability limited to execute the data provenance operation through a single chain, namely the "on-chain" subsystem, and is not suitable for multi-chain systems like supply chain systems that involve upstream and downstream relationships.

China Patent Publication No. CN108599963B discloses a blockchain-based method for provenance and verification of detection data, which comprises the steps of 1) serializing data and storing the serialized detection data in a data blockchain; 2) having a detection personnel test the data, generate a detection report and provide a label for the test result; 3) determining the authenticity and validity of the data according to the data state and the data position recorded by the data label and the log blockchain; and 4) acquiring detailed information of the data in the data blockchain through data link in the data label, calculating a hash value, and determining whether the data is tampered according to the hash value. The known method relies on characteristic decentralization of the blockchain structure, and addresses data safety by serializedly putting the data to be tested on chain and using data labels as well as Hash values to achieve fast provenance verification for the data.

However, the known method is subject to the limitation that data to be tested have to be serializedly stored in advance and then data labels are accessed one by one during traceability query. This essentially prevents query in batch. According to the existing scheme, data query requires serial traversal for all the chains one by one, making the efficiency of inter-chain traceability query undesirably low. Hence, there is a need for a system structure that supports parallel query and provides satisfying efficiency in terms of multi-chain traceability query.

Further, since there is certainly discrepancy between the prior art comprehended by the applicant of this patent application and that known by the patent examiners and since there are many details and disclosures disclosed in literature and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In order to address the problem of the prior art about low efficiency of information provenance across blockchains, the present invention provides a method for high-performance traceability query oriented to multi-chain data association, which, based on multi-chain data association, provides fast addressing for blockchains in which associated data are located, so as to ensure completeness of traceability query.

The present invention also discloses a novel system relationship blockchain (SRB) on the basis of a pluggable sub blockchain (PSB) based on multi-chain data association, so as to realize parallelism of traceability query.

To this end, in one aspect of the present invention, a pluggable sub blockchain system based on multi-chain data association is disclosed. According to the current cross-chain technology, the main chain and the side/relay chain may be different in data format and data structure. For data exchange and communication, it is necessary to verify whether the communicating parties are consistent with each other in terms of data, so as to form identifiable computational language and usable data information. The term consistency when referred to about a system shall include consistency among transactions in all subsystem PSB chains, consistency of cross-chain referencing transaction among subsystem, and consistency among cross-chain referencing transactions.

Intra-chain consistency is ensured by the consensus results of PSB. As to cross-chain consistency, it is necessary to ensure that there is ordinal relation existing between cross-chain referencing transactions. For example, where there is a transaction A in a blockchain S1 and there is a transaction B in blockchain S2, it is necessary to ensure that B is executed after A. For consistency across chains, the chronological order of cross-chain behaviors is recorded in advance to ensure global consistency of the entire system and to ensure completeness of traceability query.

Intra-chain consistency is determined by consensus of every PSB chain system. Since a PSB organizes transactions in the form of blocks, consistency among transactions in a single chain is ensured. As to cross-chain transactions, they have to be stored in the SRB and then cross-chain dependency can be confirmed according to the data association among the corresponding transactions. A specific transaction behavior will be performed and recorded in a specific PSB. SRB stores cross-chain transactions in a multi-chain system and dependents among these transactions, so as to ensure consistency across chains.

Depending on the operation types of transaction data, PSB-based basic operation of multiple blockchains is executed.

Preferably, during reading from cross-chain transactions, query is first executed on the target transaction according to cross-chain transaction data association and then the chain in which the target transaction is located returns the query results.

Preferably, during multi-chain cross-chain provenance for a certain transaction, all corresponding target chains have to be identified first using the cross-chain transaction data association, and then query requests are made parallelly. Accordingly, query is executed on the target chains using the key value of the transaction, so as to obtain query results.

Preferably, for a new transaction, the first thing to do is to determine whether there is any previous transaction on the current chain. If not, the recorded cross-chain transaction data association is used to determine whether the transaction is a transaction that has dependency existing in other chains. According to the dependency relationship and the results returned from other chains, it is to determine whether there is cross-chain consistency for the target transaction.

According to the second aspect, the present invention provides a system relationship blockchain SRB based on a PSB, with the sub blockchains in the system used as nodes in the SRB.

A PSB executes transactions in an asynchronous environment. The clock in one PSB is different from the clock of another blockchain. Transactions will only happen in individual PSBs, and a transaction of a supply chain can involve multiple blockchains only upstream or downstream.

For easy understanding, every PSB is herein regarded as a chain-shaped blockchain. These blockchain structures are compatible to the existing blockchain system. The only issue to be concerned is that when processing a transaction, the user has to consider the subsequent data provenance request. Thus, it is necessary to ensure the pre-referencing relationship of the transaction is correct, particularly when the pre-referencing transaction appears in another chain.

SRB needs to store all cross-chain related transactions and clearly record transaction and their dependency relationships, so as to ensure ready acquisition of the upstream source of the transaction data. A blockchain ledger is an only-incremented data structure that records transactions as Hash chains. Therein, each block contains a batch of transactions. In an existing multi-chain data provenance system, processing transactions in batch can lose dependency information of the transactions. Therefore, in SRB, every block contains a transaction having the dependency relationship. A blockchain ledger in SRB is composed of impending cross-chain transactions. For supporting the provenance of transaction data, the associated transactions have to be recorded before a cross-chain transaction has been determined as happened, so as to ensure that the results of the traceability query for associated transactions are complete.

The whole system is designed to support a set of distributed sub blockchains that are mutually co-operative. Every sub blockchain maintains a set of local records. Public transactions among distributed sub blockchains will be recorded in a dedicated SRB blockchain, and multi-chain data dependents are established according to transaction association. As a result, it is not necessary that individual PSBs trust each other, and individual PSBs can be dynamically added into or removed from the system without affecting data integrity.

The present invention provides a method for high-performance traceability query oriented to multi-chain data association, comprising: identifying a target transaction needing the traceability query; searching out all corresponding target chains based on cross-chain transaction data association; making query requests parallelly; and executing the query among the target chains according to a key value of the target transaction and returning query results.

The present invention further provides a method for high-performance traceability query oriented to multi-chain data association, comprising: when a first node requires traceability query, querying cross-chain referencing transactions from a system relationship blockchain based on distributed sub blockchains; and according to returned query results, querying transactions existing in each of at least one pluggable sub blockchain among the distributed sub blockchains; wherein by using cross-chain transaction dependents recorded in the system relationship blockchain, the query process is executed parallelly in each said pluggable sub blockchain and the query results are returned.

According to one preferred embodiment, public transaction records between/among said at least one pluggable sub blockchains are stored in the system relationship blockchain and cross-chain dependency is determined according to the corresponding transaction data association, thereby realizing establishment of the cross-chain transaction dependents according to transaction association.

According to one preferred embodiment, the at least one pluggable sub blockchains are configured to be dynamically added into or removed from the system relationship blockchain without affecting integrity of data in the system relationship blockchain or in the pluggable sub blockchains.

According to one preferred embodiment, different pluggable sub blockchains use an identical data dependency structure, so that the traceability query between multiple sub chains can realize cross-chain query by directly reading data dependency of other chains.

According to one preferred embodiment, when there is a new transaction, determining whether there is a previous transaction in the current chain; and if there is a previous transaction in the current chain, recording this transaction; or if there is no previous transaction in the current chain, determining whether this transaction has dependent transaction on other chains according to the recorded cross-chain transaction data association.

According to one preferred embodiment, after all the pluggable sub blockchains return the query results, the first node verifies the query results according to block heads stored previously.

According to one preferred embodiment, the first node determines whether there is cross-chain consistency for the target transaction according to dependency relationship and the query results returned from other chains.

According to one preferred embodiment, the system relationship blockchain records associated affairs before occurrence of the cross-chain transaction is confirmed.

The present invention further provides a system for high-performance traceability query oriented to multi-chain data association, comprising a system relationship blockchain and at least one pluggable sub blockchain, wherein the at least one pluggable sub blockchain acts as one node of the system relationship blockchain and is configured to be dynamically added into or removed from the system relationship blockchain, and/or the system relationship blockchain stores cross-chain transactions between the pluggable sub blockchains and multi-chain data dependents of the transactions, so that the high-performance traceability query system is able to parallelly process cross-chain query, and/or different pluggable sub blockchains use an identical data dependency structure.

Generally, with the foregoing technical schemes, the present invention provides the following beneficial effects:

(1) To solve problems about poor completeness of traceability query for multi-blockchain systems and low efficiency of cross-chain query, the present invention discloses a blockchain traceability query method based on data association. Therein an SRB blockchain based on data association enables parallel cross-chain query, leading to good query performance. Opposite to the conventional blockchain where blocks are used as nodes of chains, the present invention directly uses sub blockchains as nodes of the SRB. Since sub blockchains can be dynamically added or removed, the present invention enhances the scalability of the entire system.

(2) The present invention unifies dependency structure of transaction data at the bottom layer, which means different sub blockchains use the same data dependency structure. Thereby, traceability query among multiple chains can be achieved by directly reading data dependency of other chains. Different from serialized block data query conducted in the chain-type structure, the disclosed cross-chain query operation can be parallelly executed, leading to improved efficiency of traceability query. Meanwhile, since SRB stores all cross-chain transaction and the corresponding dependency, completeness of multi-chain traceability query can be ensued.

DETAILED DESCRIPTION OF THE INVENTION

Figure 1:
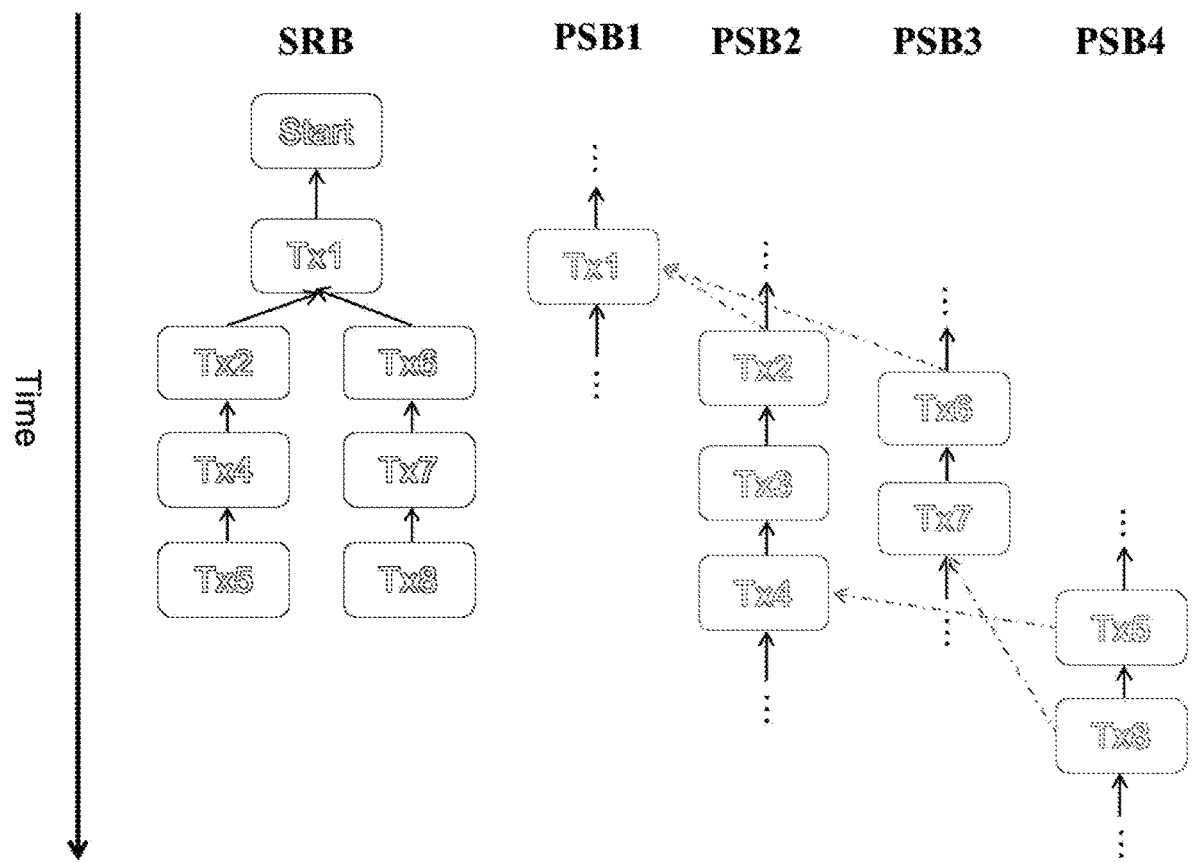
FIG. 1 is a schematic illustration for explaining preferred multi-chain data dependency of the present invention provide.

For clearly expounding the objective, technical schemes and advantages of the present invention, terms referred in the description and appended claims are explained as below:

Blockchain: In a narrow sense, a blockchain is a chain-like data structure wherein data blocks are connected in chronological order, or, is a distributed ledger that is secured cryptographically from falsification and tampering. In a broad sense, the blockchain technology provides a whole new computational paradigm based on a distributed basic structure that employs a block chain-like data structure to verify and store data, implements a distributed node consensus algorithm to generate and update data, adopts a cryptographical way to ensure safe data transfer and access, and uses a smart contact composed of auto-script codes to program and operate data. A blockchain is essentially a decentralized database, or, a series of associated data blocks generated using a cryptographical method. Every data block includes information about one blockchain transaction. Using a blockchain, the entire process of a value transfer (i.e., a transaction) can be recorded in a complete and "incorruptible" manner. In formation of a blockchain, blocks are strung up in chronological order. Every node participating formation of consensus has a complete copy of information of the blockchain. At the core of a blockchain network is a ledger in the form of electronic records, wherein every block is a page of this ledger, "linked" from the first page to the latest page. Once these blocks are conformed, modification thereto is virtually impossible. Every block contains information about all transactions in a recent period and blocks meta data.

Block: In a typical blockchain system, data are generated and stored as blocks. Every block records information about all transactions happening in a certain period of time. A block refers to a data structure, which includes two parts: block meta data and the block body. Therein, the block meta data record information of meta data of blocks, while the block body records all transactions that have happened since the generation of the previous block till the creation of the present block. The block body is composed of individual transactions, or packed transactions, or the actual data stored in the blockchain. Block meta data include three parts: the block size, the block head, and the transaction counter. Therein, the block head includes information about the Hash value of the previous block, the Hash value of the present block, the block height of the present block, the timestamp and so on. The block head is used to link the previous block and to ensure the completeness of the existing data through a timestamp mechanism. The block body contains transaction data, such as the transaction data to be processed in the process that the nodes in the blockchain system reach consensus with respect to blocks and the transaction results of processing of the transaction data to be processed.

New block: The generation of a new block requires the approval from the majority (determined by the consensus mechanism used) of nodes in the whole network, and is broadcasted to the whole network for synchrony throughout the network. Once generated, a data block cannot be changed or deleted.

Transaction: A transaction refers to an entry in a page of a ledger, and is used to confirm a fact or to perform a set of codes.

Ledger: A ledger is composed of a set of blocks (or referred to as pages) connected end to end, and is used to record transactions and the state of the world of the blocks.

Double spending: In a blockchain network, due to reproducibility of data, digital assets may be reused. For example, parallel blockchain transactions may be executed on the same digital asset (as known as double spending). In some situations, where multiple parallel blockchain transactions are read from the same data, once the first parallel blockchain transaction has undergone data modification, the other parallel blockchain transactions can fail due to this data modification. This is the so-called double spending. For example, assuming that Chain A had finished a cross-chain transaction from Chain A to Chain B, and then Chain A forked due to an attack conducted by a hacker, making the previous cross-chain transactions not located in the longest branch of Chain A anymore. Then the account that made the earlier money transfer may initiate a double spending attack to send an additional cross-chain transaction to Chain B, so as to make Chain B release corresponding tokens, thereby causing one transaction in Chain A to bring about two releases in Chain B, namely double spending.

Node: Every node in a blockchain network is like a computer or server terminal that stores all block data. Generation of new blocks, verification and bookkeeping of transactions, and broadcasting to the whole network for synchrony are all tasks of nodes. In a blockchain network, a node refers to a participant that has a unique identity, the node has a complete copy of the ledger and has the capability of participating in blockchain network consensus and maintaining the ledge. A node is also known as a miner. For a miner, how much bookkeeping right it can be assigned and how much reward it can receive are determined by its computing power.

Consensus: This refers to a process where the transactions of the whole ledger get synchronized in a network. Currently, for any node in a blockchain, when a transaction happens thereon, each of the other nodes of the same blockchain reaches consensus with it. The nodes are connected mutually according to TCP (Transmission Control Protocol)/IP (Internet Protocol).

Consensus mechanism: This refers to mathematic algorithms that enable nodes in a blockchain system to build trust and acquire equity. In other words, a blockchain is distributed network, and needs to communicate block information or transaction information to individual nodes in the network through network broadcasting. The mechanism of realizing how the network nodes shall verify the broadcasted information and which block shall do the recording work is the consensus mechanism. The consensus mechanism solves the problem about consistency of a blockchain in a distributed scene. A blockchain also relies on the consensus mechanism to reach a relatively equilibrated state among its numerous nodes.

Consensus node: A consensus node is a node that is allowed to participate in a consensus block, and its main functions include: packing transactions in the transaction pool into blocks, executing transactions, running consensus algorithms, and writing blocks for which consensus has been reached into the ledger. Consensus nodes in a blockchain system may have various functions, such as the routing function, the transaction function, the blockchain function and the consensus function. Specifically, a consensus node in a blockchain system can pass the information, such as transaction data, it receives from other consensus nodes to more nodes so as to realize communication between nodes. Alternatively, a consensus node in a blockchain system can be used to support users to conduct transactions. Alternatively, a consensus node in a blockchain system can be used to record all historical transaction. Alternatively, a consensus node in a blockchain system can generate new blocks in the blockchain by verifying and recording transactions. In practical use, the routing function is an essential function that every consensus node in a blockchain system must have, while other functions may be optional according to practical needs. In a blockchain system, one consensus node may be in a physical machine (e.g., a server), and a consensus node may be specifically a progress or a series of progresses running in the server.

Consensus algorithm: Every node in a blockchain network verifies a batch of transactions using the same algorithm, and this ensures all nodes produce consistent verification results for the same batch of data. This very algorithm is the consensus algorithm of this blockchain. The presently common consensus algorithms include Practical Byzantine Fault Tolerance (PBFT) and Replication and Fault Tolerant (Raft).

Cross-chain technology: It is a technology that supports transfer of data or assets among multiple types of blockchains, and acts as a bridge that allows blockchains to expand outward or be connected to the exterior.

Multi-chain technology: Like the cross-chain technology, the multi-chain technology is also a solution for enhancing the scalability of blockchains. The term "multi-chain" means that a node can operate multiple chains. This can be understood as that every chain has its own independent ledger data (i.e., block data), and transactions in different chains are executed parallelly without mutual influence.

Key value: A blockchain system comprises application layers and a bottom-layer data storage system, and the bottom-layer data storage system may adopt various bottom-layer data storage technologies, among which the key-value pair (KV) storage system is a common one. A transaction after being executed in the blockchain system is generally stored in to the database in the form of Key-Value. The term "key value" herein may refer to data distributedly stored in the form of a Key-Value.

Transaction: In a blockchain, any operation (deploying contracts, invoking contract interface, etc.) is executed by means of sending a transaction. A transaction is initiated by a user, and then sent to a blockchain node through a client. After receiving the transaction, the blockchain node packs the transaction into a block and executes it. A transaction happens between different blockchain networks is referred to as a cross-chain transaction. For example, a transaction may be initiated by a node in a female chain, and the other party of the transaction is a node in a male chain. As another example, a transaction may be initiated by a female chain, and the other party of the transaction is another female chain.

Observer node: While a consensus node participates in voting to reach consensus for a block and synchronization of transactions/blocks, an observer node only participates in block synchronization, and does not participate in the voting. An observer node serves to acquire the latest block from a consensus node or a copy node, to do execution, to verify the execution result of the block, and put the generated block on-chain.

The present invention will be further detailed below with reference to accompanying drawings and particular embodiments. It is to be understood that these embodiments are only illustrative but not limiting. Moreover, the technical features referred to in the embodiments of the present invention may be combined with each other in any manner as long as no conflicts are caused therebetween.

To realize a blockchain system that is scalable and supports cross-chain high-performance traceability query, the present invention first provides a structural design for multi-chain data association as below:

(1) The multi-echelon supply chain system supports pluggable sub blockchains (PSBs), and allows blocks and transactions in a sub blockchain to be parallelly added into the ledger of the entire system instead of doing this serially. Such a pluggable way helps to not only improve the scalable of the entire system, but also increase capacity of transactions between different chains.

(2) The present invention supports effective parallel traceability query among multiple chains. This means that traceability query may be executed within a sub blockchain PSB and/or across different chains, including query to ascertain whether some transaction has been packed and whether some cross-chain transaction has been received by another chain.

(3) By using a unified data dependency structure across sub blockchains, conversion of different traceability query formats of the chains can be reduced, and cross-chain transactions can be directly stored in SRBs. This means that the need of additional data conversion among chains can be eliminated. In addition, unified data dependency structure can increase exchangeability among chains. As conversion of data structures of different chains is no more a need, data dependency relationship can be readily shared among chains.

With the foregoing multi-chain data dependency structure, the present invention provides a method for high-performance traceability query based on multi-chain data association.

In the transaction data dependency structure of an SRB, different PSB blockchains adopt a unified data structure, so as to improve the usability of cross-chain traceability query. Since the data dependents structure of the cross-chain transactions is unified, a node of one chain can actively require cross-chain data from another chain, thereby realizing universal query for cross-chain transactions. The exact format of dependents is not limited herein as long as a unified one is used.

In an SRB, the participants are all PSB nodes. PSB nodes can be divided into two types: consensus nodes and observer nodes.

Consensus nodes first reach consensus for the cross-chain transaction about to happen and record it in the SRB, so as to ensure cross-chain consistency and intra-chain consistency. A consensus node is formed by a node that needs to require for a cross-chain transaction.

Consensus nodes reach consensus for transaction that happens, record possible cross-chain referencing behaviors in the SRB. The consensus result is provided to observer nodes.

The observer nodes accept the cross-chain reference consensus reached among the consensus nodes, and verify whether the current transaction has the cross-chain behavior. An observer node is formed by a node that does not participate in the cross-chain behavior.

For executing a transaction, a node in an SRB first determines whether there is a previous transaction prior to the current transaction. If there is a previous transaction in the current chain, the transaction is recorded. If there is no previous transaction in the current chain, the case may be either of below. First, there is not such a previous transaction. Second, the previous transaction prior to the current transaction may appear in an upstream blockchain. At this time, the executor of the transaction sends a query request to the SRB to check whether there is a previous transaction existing in another chain. If there is no previous transaction existing in another chain, this means that there is not such a previous transaction, and the transaction can be recorded without security concern. If there is a previous transaction existing in another chain, the blockchain where the previous transaction exists has to provide a proof of execution of a corresponding transaction. If the transaction exists, it is executed, or otherwise, it is refused.

As shown in FIG. 1, the individual PSBs are asynchronous, and the system needs to ensure consistency of transactions. Since the rules for cross-chain transactions have been determined before the transaction is executed, there will be no abnormal cross-chain behaviors such as hiding cross-chain information, double spending and the like. For basic transactions within an individual PSB, the execution only exists in the individual PSB, and its reliability is ensured by means of its own blockchain consensus mechanism. For cross-chain behaviors with respect to multiple blockchains in a system, when execution of a transaction is impossible, another node may identify the problematic node through the data provenance mechanism of the system, thereby ensuring tolerance during operation of the multi-chain system.

An SRB has to record the association among cross-chain transactions. The participants of a cross-chain transaction come from different blockchains, and the upstream/downstream relationship between cross-chain transactions is of great importance to completeness of cross-chain traceability.

Cross-chain referencing transactions are transactions happening among multiple independent blockchains, but the transactions in these independent blockchains have upstream/downstream dependency. The dependents must be represented clearly, and they are not dependent on logic execution. Implicit dependency is similar to a transfer behavior toward the same account. Only when a money transfer behavior is completed, the transaction logic is correct. Even if money transfer transactions are not executed sequentially, the sequential logic of money transfer among different accounts is correct. However, in a supply chain, the execution relationship among different participants has to be clearly determined, so as to ensure logic consistency of the records. The multi-chain data association may be referred to the foregoing transaction execution relationship.

In order to ensure the completeness and testability of the multi-chain traceability query, the consensus node in SRB has to identify the transaction that is subject to cross-chain referencing before a given transaction is executed, and then the transaction is recorded in the SRB blockchain system. This process is similar to the order-placing operation in a supply chain.

In spite of many non-crossing behaviors among PSB systems, there are still cross-chain transactions that are mutually dependent. After conforming the cross-chain dependency, the consensus node sends the result to an observer node of SRB. According to the cross-chain referencing relationship, the observer node monitors blockchain heads of cross-chain transactions related to itself, so as to ensure cross-chain consistency when verifying the previous transaction of the given transaction.

Figure 2:
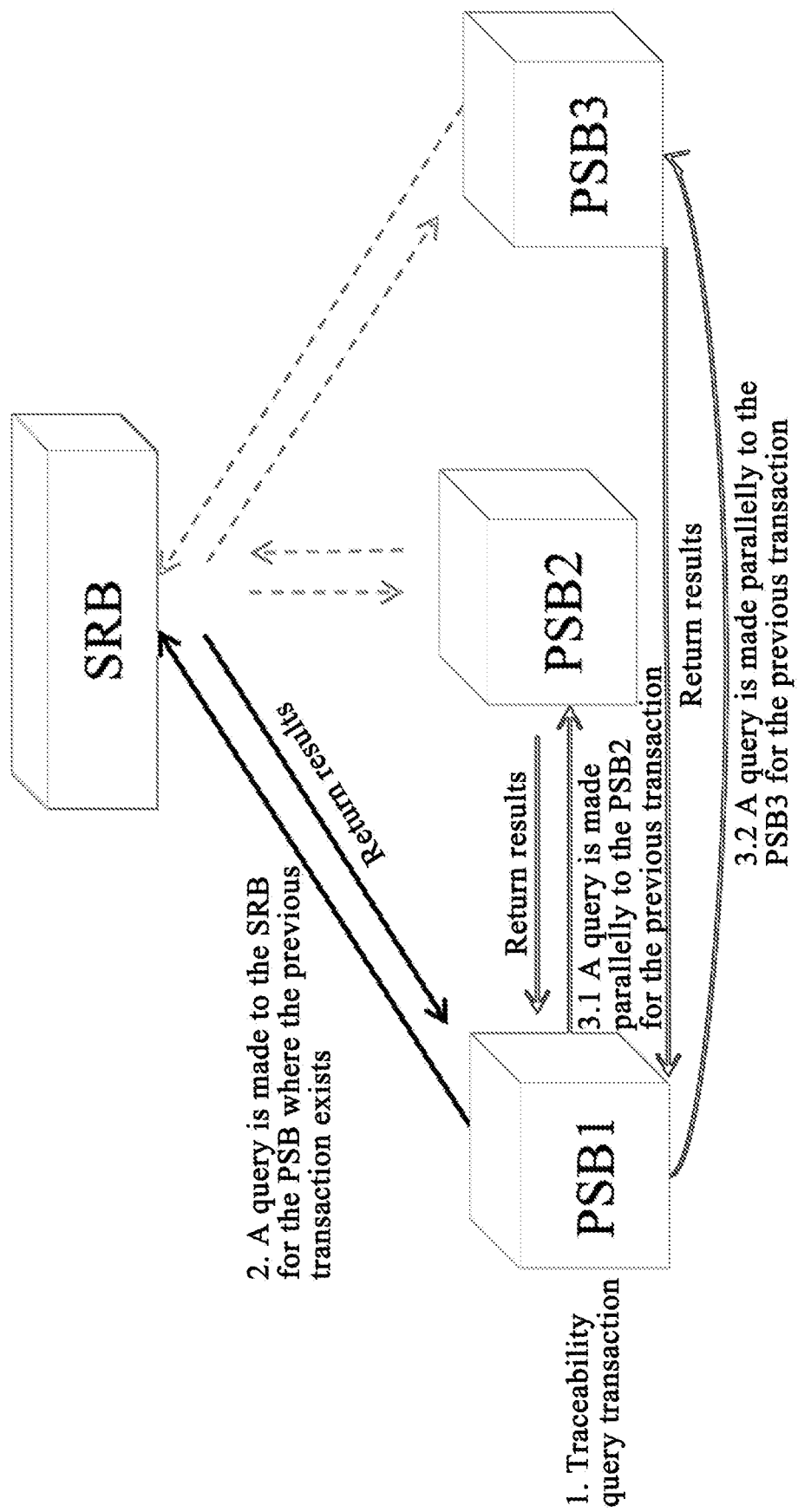
FIG. 2 is a flowchart of a preferred method for high-performance traceability query according to the present invention.

As shown in FIG. 2, with the divide-and-conquer approach, traceability query operation can be executed parallelly in multiple chains associated with the target, and completeness of traceability query transactions can be ensured. When traceability query is required for a node, query is made to the SRB for a cross-chain referencing transaction, and query is made to the PSBs for transactions existing in every chain according to the returned results. By recording cross-chain transaction dependents in SRBs, this query process can be executed in every PSB parallelly. After all the nodes return their query results, the traceability query node verifies the query results according to the block heads stored previously.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not come off the concept of the present invention should be encompassed by the appended claims.

The description of the present invention contains a number of inventive concepts, and the applicant reserves the right to file a divisional application based on each of the inventive concepts. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A method for high-performance traceability query oriented to multi-chain data association, comprising:
    identifying a target transaction needing the traceability query;
    searching out all corresponding target chains based on cross-chain transaction data association;
    making query requests parallelly; and
    executing the query among the target chains according to a key value of the target transaction and returning query results,
    wherein public transaction records between/among said at least one pluggable sub blockchains are stored in the system relationship blockchain and cross-chain dependency is determined according to the corresponding transaction data association, thereby realizing establishment of the cross-chain transaction dependents according to transaction association, and
    wherein the at least one pluggable sub blockchains are configured to be dynamically added into or removed from the system relationship blockchain without affecting integrity of data in the system relationship blockchain or in the pluggable sub blockchains, and
    wherein different pluggable sub blockchains use an identical data dependency structure, so that the traceability query between multiple sub chains can realize cross-chain query by directly reading data dependency of other chains, and
    wherein determining there is a new transaction comprises:
        determining said transaction is a previous transaction in the current chain, causes the data association to record this transaction; and
        determining said transaction is not a previous transaction in the current chain, causes the data association to determine the transaction has a dependent transaction on the other chains according to the recorded cross-chain transaction data association.

2. The method of claim 1, wherein after all the pluggable sub blockchains return the query results, the first node verifies the query results according to block heads stored previously.

3. The method of claim 2, wherein the first node determines whether there is cross-chain consistency for the target transaction according to dependency relationship and the query results returned from other chains.

4. The method of claim 3, wherein the system relationship blockchain records associated affairs before occurrence of the cross-chain transaction is confirmed.

5. A method for high-performance traceability query oriented to multi-chain data association, comprising:
    when a first node requires traceability query, querying cross-chain referencing transactions from a system relationship blockchain based on distributed sub blockchains; and
    according to returned query results, querying transactions existing in each of at least one pluggable sub blockchain among the distributed sub blockchains,
    wherein by using cross-chain transaction dependents recorded in the system relationship blockchain, the query process is executed parallelly in each said pluggable sub blockchain and the query results are returned,
    wherein public transaction records between/among said at least one pluggable sub blockchains are stored in the system relationship blockchain and cross-chain dependency is determined according to the corresponding transaction data association, thereby realizing establishment of the cross-chain transaction dependents according to transaction association, and
    wherein the at least one pluggable sub blockchains are configured to be dynamically added into or removed from the system relationship blockchain without affecting integrity of data in the system relationship blockchain or in the pluggable sub blockchains, and wherein different pluggable sub blockchains use an identical data dependency structure, so that the traceability query between multiple sub chains can realize cross-chain query by directly reading data dependency of other chains, and
    wherein determining there is a new transaction comprises:
        determining said transaction is a previous transaction in the current chain, causes the data association to record this transaction; and
        determining said transaction is not a previous transaction in the current chain, causes the data association to determine the transaction has a dependent transaction on the other chains according to the recorded cross-chain transaction data association.

6. The method of claim 5, wherein after all the pluggable sub blockchains return the query results, the first node verifies the query results according to block heads stored previously.

7. The method of claim 6, wherein the first node determines whether there is cross-chain consistency for the target transaction according to dependency relationship and the query results returned from other chains.

8. The method of claim 7, wherein the system relationship blockchain records associated affairs before occurrence of the cross-chain transaction is confirmed.

* * * * *